US012249341B2

(12) United States Patent
Bok

(10) Patent No.: US 12,249,341 B2
(45) Date of Patent: Mar. 11, 2025

(54) ELECTRONIC APPARATUS AND METHOD OF CONTROLLING THE SAME

(71) Applicant: Samsung Electronics Co., Ltd., Suwon-si (KR)

(72) Inventor: Chansik Bok, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 591 days.

(21) Appl. No.: 17/505,925

(22) Filed: Oct. 20, 2021

(65) Prior Publication Data

US 2022/0139413 A1 May 5, 2022

Related U.S. Application Data

(63) Continuation of application No. PCT/KR2021/011646, filed on Aug. 31, 2021.

(30) Foreign Application Priority Data

Oct. 30, 2020 (KR) .................... 10-2020-0143186

(51) Int. Cl.
*G10L 15/22* (2006.01)
*G10L 15/02* (2006.01)
(Continued)

(52) U.S. Cl.
CPC .......... *G10L 21/0216* (2013.01); *G10L 15/02* (2013.01); *G10L 15/08* (2013.01);
(Continued)

(58) Field of Classification Search
CPC ............... G10L 15/22; G10L 2015/088; G10L 2015/223; G10L 15/26; G10L 5/30;
(Continued)

(56) References Cited

U.S. PATENT DOCUMENTS 9,729,821 B1 *  8/2017  Fineberg ............... H04W 4/029
10,685,652 B1 *  6/2020  Cherukuri ............... G10L 25/51
(Continued)

FOREIGN PATENT DOCUMENTS

CN       110457078 A    11/2019
CN       111223497 A     6/2020
(Continued)

OTHER PUBLICATIONS

International Search Report, PCT/ISA/210, and Written Opinion, PCT/ISA/237, dated Dec. 3, 2021 in Application No. PCT/KR2021/011646.

(Continued)

*Primary Examiner* — Olujimi A Adesanya
(74) *Attorney, Agent, or Firm* — STAAS & HALSEY LLP

(57) ABSTRACT

An electronic apparatus includes an interface configured to connect with an external apparatus, and a processor. The processor is configured to, in response to a first user speech received by the electronic apparatus including a trigger word, identify a first noise level corresponding to the first user speech received by the electronic apparatus. The processor is configured to identify a first recognition apparatus among a plurality of recognition apparatuses having a highest first noise level corresponding to the first user speech. The plurality of recognition apparatuses identify the first user speech as the trigger word and include the electronic apparatus and the external apparatus. The processor is configured to perform a control operation to implement a function corresponding to a second user speech in response to identifying a second recognition apparatus as having a highest second noise level corresponding to the second user speech among the plurality of recognition apparatuses.

13 Claims, 10 Drawing Sheets

(51) Int. Cl.
*G10L 15/08* (2006.01)
*G10L 21/0216* (2013.01)
*G10L 25/84* (2013.01)
*G10L 21/0208* (2013.01)

(52) U.S. Cl.
CPC .................. *G10L 2015/088* (2013.01); *G10L 2021/02082* (2013.01)

(58) Field of Classification Search
CPC ....... G10L 25/78; G10L 15/063; G10L 17/00; G10L 15/00
See application file for complete search history.

(56) References Cited

U.S. PATENT DOCUMENTS

| | | | |
|---|---|---|---|
| 10,735,597 B1* | 8/2020 | Zagorski | H04N 7/147 |
| 2014/0136195 A1* | 5/2014 | Abdossalami | G10L 15/26 |
| | | | 704/235 |
| 2014/0172953 A1* | 6/2014 | Blanksteen | H04L 51/18 |
| | | | 709/203 |
| 2016/0210965 A1 | 7/2016 | Mun et al. | |
| 2017/0025124 A1* | 1/2017 | Mixter | G10L 15/22 |
| 2017/0076720 A1* | 3/2017 | Gopalan | G10L 15/22 |
| 2017/0154625 A1 | 6/2017 | Heo | |
| 2018/0096690 A1* | 4/2018 | Mixter | G10L 15/08 |
| 2018/0096696 A1* | 4/2018 | Mixter | G10L 15/20 |
| 2018/0342244 A1 | 11/2018 | Thomsen | |
| 2019/0295542 A1* | 9/2019 | Huang | G06F 3/167 |
| 2019/0325865 A1 | 10/2019 | Oktem et al. | |
| 2020/0143807 A1 | 7/2020 | Ko | |
| 2020/0265838 A1* | 8/2020 | Lee | G06F 3/167 |
| 2021/0043203 A1 | 2/2021 | Gao et al. | |
| 2021/0074283 A1 | 3/2021 | Park | |
| 2022/0066008 A1* | 3/2022 | Jones | H04R 27/00 |

FOREIGN PATENT DOCUMENTS

| | | |
|---|---|---|
| JP | 4581441 | 9/2010 |
| JP | 6513749 | 4/2019 |
| KR | 10-2015-0144547 A | 12/2015 |
| KR | 10-2016-0089145 A | 7/2016 |
| KR | 10-2018-0128838 A | 12/2018 |
| KR | 10-2019-0109341 A | 9/2019 |
| KR | 10-2020-0024068 | 3/2020 |
| KR | 10-2020-0050152 | 5/2020 |
| KR | 10-2020-0051462 A | 5/2020 |

OTHER PUBLICATIONS

Office Action dated Feb. 26, 2024, in European Application No. EP 21 88 6527.

* cited by examiner

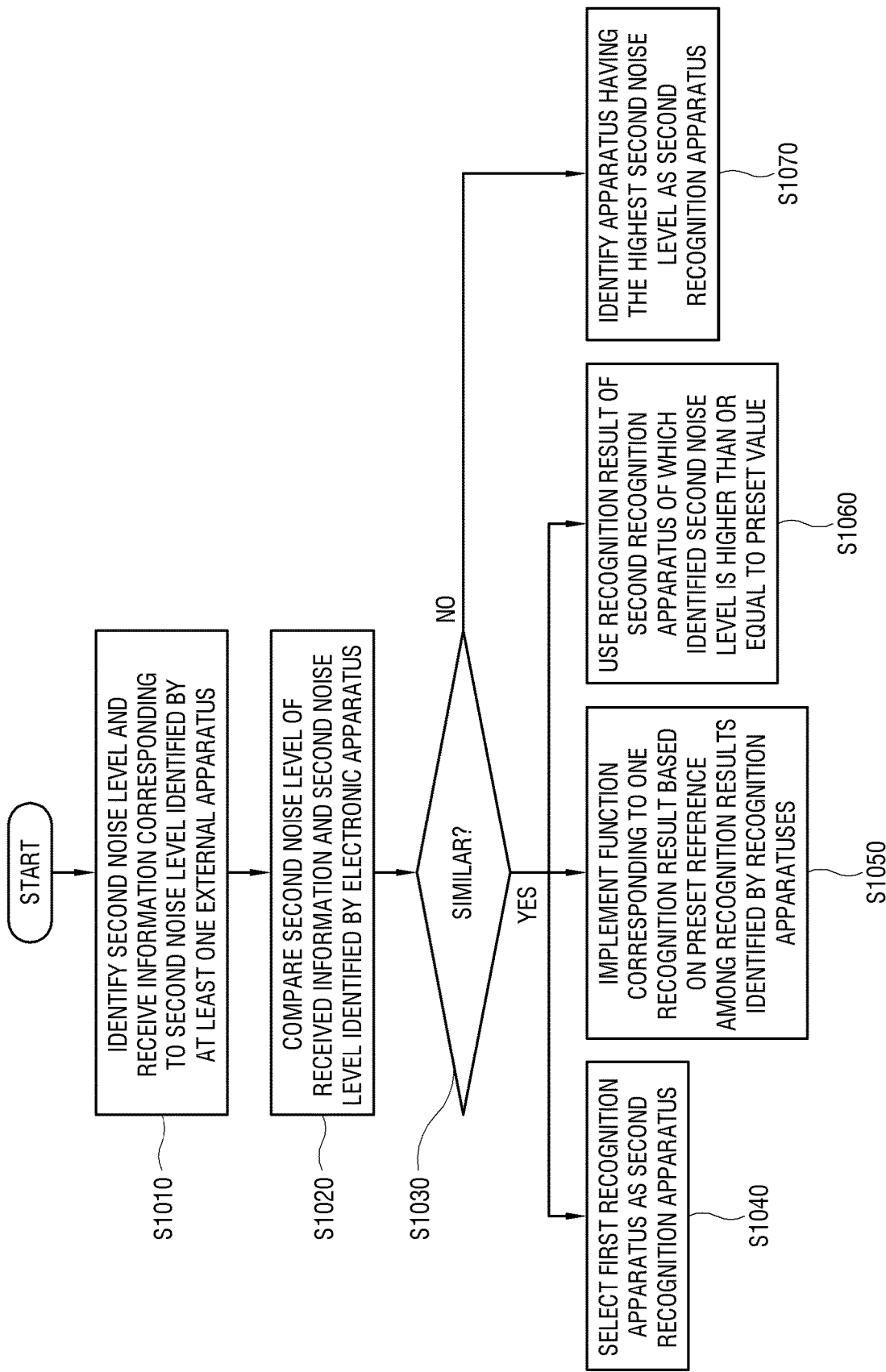

ELECTRONIC APPARATUS AND METHOD OF CONTROLLING THE SAME

CROSS-REFERENCE TO RELATED APPLICATIONS

This application is a continuation application under 35 U.S.C. § 111(a) of International Application No. PCT/KR2021/011646, filed on Aug. 31, 2021, which claims priority to Korean Patent Application No. 10-2020-0143186 filed on Oct. 30, 2020. The disclosures of each of International Application No. PCT/KR2021/011646 and Korean Patent Application No. 10-2020-0143186 are incorporated by reference herein in their entirety.

BACKGROUND

1. Field

The disclosure relates to an electronic apparatus, in which an image displayed on a display is prevented from degradation, and a method of controlling the same.

2. Description of Related Art

With popularization of speech recognition technology and generalization of a speech recognition function provided by an electronic apparatus, a plurality of electronic apparatuses in one place may support speech recognition. In this case, when a user utters a trigger word (or a wakeup word) to execute the speech recognition, the plurality of electronic apparatuses using the same trigger word recognizes the user's utterance at the same time and it is therefore uncertain which electronic apparatus will consequently implement a function corresponding to the speech recognition. Accordingly, to solve this problem, there has been developed multi-device wakeup (MDW) technology that performs the function corresponding to the speech recognition by selecting an electronic apparatus in which an utterance level of the trigger word is most highly recognized.

However, when there is a single electronic apparatus in a space where the speech recognition is performed to recognize the trigger word, it is possible to increase a success rate of the speech recognition by turning the electronic apparatus' own volume level down. On the other hand, when there is a plurality of electronic apparatuses, the success rate of the speech recognition performed by one electronic apparatus is lowered due to sounds output from other electronic apparatuses unless all the plurality of electronic apparatuses' volume levels are turned down for the speech recognition.

SUMMARY

Additional aspects will be set forth in part in the description which follows and, in part, will be apparent from the description, or may be learned by practice of the disclosed embodiments.

According to an embodiment of the disclosure, there is provided an electronic apparatus includes an interface configured to connect with an external apparatus, and a processor. The processor may be configured to, in response to a first user speech received by the electronic apparatus including a trigger word, identify a first noise level corresponding to the first user speech received by the electronic apparatus. The processor may be configured to identify a first recognition apparatus among a plurality of recognition apparatuses having a highest first noise level corresponding to the first user speech. The plurality of recognition apparatuses may include the electronic apparatus and the external apparatus. Each of the plurality of recognition apparatuses may identify the first user speech as the trigger word. The processor may be configured to perform a control operation to implement a function corresponding to a second user speech received after the first user speech based on identifying a second recognition apparatus as having a highest second noise level corresponding to the second user speech among the plurality of recognition apparatuses.

The processor may be configured to implement the function corresponding to the second user speech based on a natural language processing engine corresponding to the first recognition apparatus among a plurality of natural language processing engines respectively corresponding to the plurality of recognition apparatuses.

The processor may be configured to output a sound through a loudspeaker, and turn down a level of the sound based on the electronic apparatus identified as the first recognition apparatus.

The processor may be configured to output a sound through a loudspeaker, and maintain a level of the sound based on the at least one external apparatus identified as the first recognition apparatus.

The processor may be configured to identify the electronic apparatus as the second recognition apparatus based on the electronic apparatus identified as the first recognition apparatus and a level of a sound from the at least one external apparatus lower than a preset value The electronic apparatus may further include a loudspeaker, and the processor may be configured to output a sound through the loudspeaker, and obtain the second user speech by canceling a signal corresponding to the sound output through the loudspeaker from a signal including the second user speech based on the electronic apparatus identified as the second recognition apparatus.

The processor may be configured to identify the first noise level based on an utterance level of the first user speech.

The processor may be configured to identify the second noise level based on a noise level of the second user speech.

The processor may be configured to receive information corresponding to a second noise level identified by the external apparatus through the interface, and select the first recognition apparatus as the second recognition apparatus, based on the second noise level of the received information similar to a second noise level identified by the electronic apparatus.

The processor may be configured to receive information corresponding to a second noise level identified by the external apparatus through the interface, and implement the function corresponding to a recognition result based on a preset reference among a plurality of recognition results identified by the plurality of recognition apparatuses, based on the second noise level of the received information similar to a second noise level identified by the electronic apparatus.

The processor is configured to control the interface to transmit information, which corresponds to a command for controlling the first recognition apparatus to implement the function corresponding to the second user speech, to the external apparatus corresponding to the first recognition apparatus, based on the electronic apparatus identified as the second recognition apparatus.

According to another embodiment of the disclosure, there is provided a method of controlling an electronic apparatus, the method including receiving a first user speech which includes a trigger word, identifying a first noise level corresponding to the first user speech, identifying a first recognition apparatus among a plurality of recognition apparatuses having a highest first noise level corresponding to the first user speech, wherein the plurality of recognition apparatuses includes the electronic apparatus and an external apparatus, each of the plurality of recognition apparatuses identifying the first user speech as the trigger word, and performing a control operation to implement a function corresponding to a second user speech received after the first user speech, in response to identifying a second recognition apparatus as having a highest second noise level corresponding to the second user speech among the plurality of recognition apparatuses.

The performing the control operation may include implementing the function corresponding to the second user speech based on a natural language processing engine corresponding to the first recognition apparatus among a plurality of natural language processing engines respectively corresponding to the plurality of recognition apparatuses.

The method may further include outputting a sound through a loudspeaker and turning down a level of the sound based on the electronic apparatus identified as the first recognition apparatus.

According to another embodiment of the disclosure, there is provided a non-transitory recording medium configured to store a computer program including computer readable code for performing a method of controlling an electronic apparatus, the method including identifying a first noise level corresponding to a first user speech received by the electronic apparatus, the first user speech including a trigger word, identifying a first recognition apparatus among a plurality of recognition apparatuses having a highest first noise level corresponding to the first user speech, wherein the plurality of recognition apparatuses includes the electronic apparatus and an external apparatus, each of the plurality of recognition apparatuses identifying the first user speech as the trigger word, and performing a control operation to implement a function corresponding to a second user speech received after the first user speech, in response to identifying a second recognition apparatus as having a highest second noise level corresponding to the second user speech among the plurality of recognition apparatuses.

BRIEF DESCRIPTION OF THE DRAWINGS

The above and other aspects, features, and advantages of the disclosure will become more apparent from the following description of example embodiments with reference to the accompanying drawings, in which:

FIG. 10 illustrates an operation flowchart of an electronic apparatus according to an embodiment of the disclosure.

DETAILED DESCRIPTION

Figure 1:
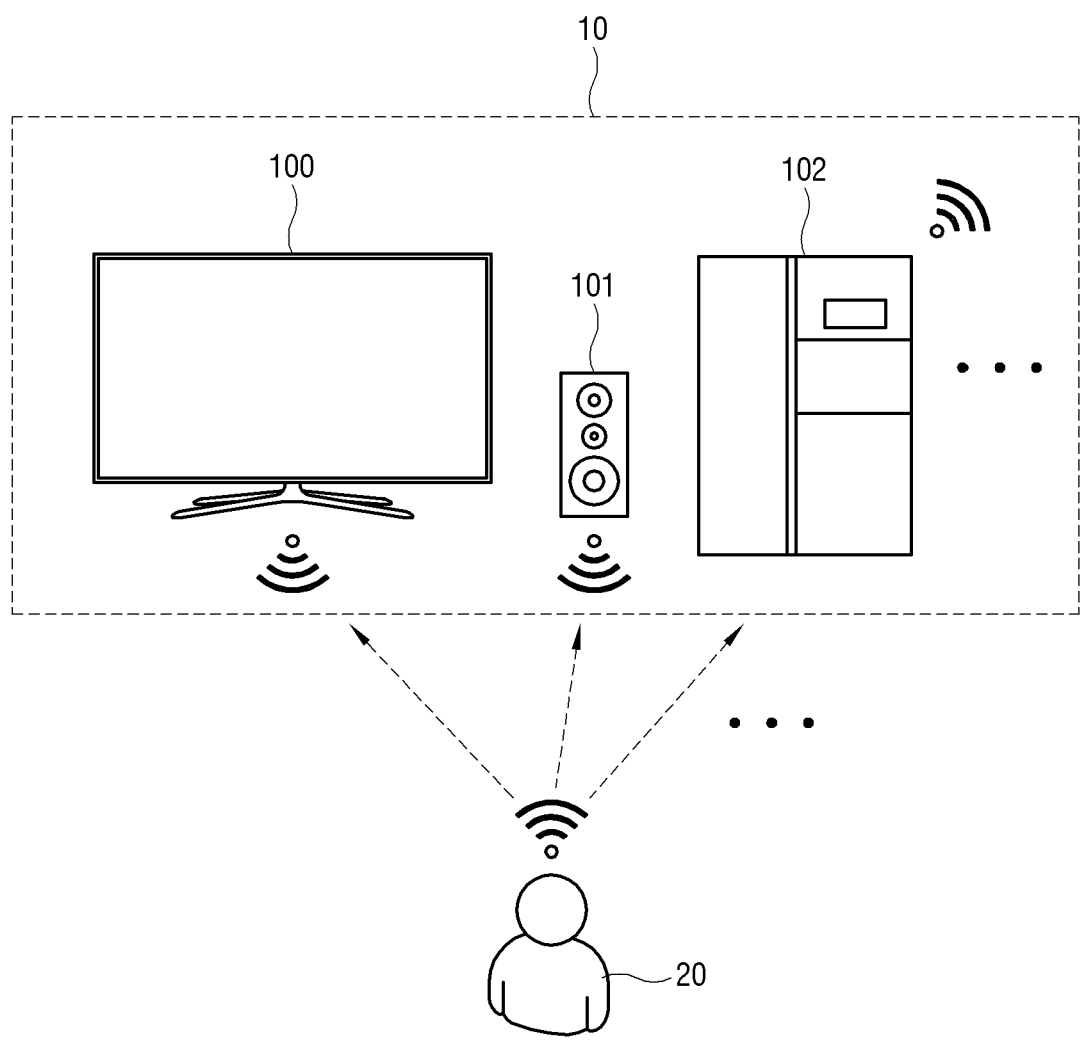
FIG. 1 illustrates a system according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its components and functions are not limited to those described in the following embodiments. In the following descriptions, details about publicly known technologies or components may be omitted if they unnecessarily obscure other features of the disclosure.

In the example embodiments, terms 'first', 'second', etc. are used to distinguish one element from another, and singular forms such as "a", "an," and "the," are intended to include plural forms unless the context clearly indicates otherwise. In the example embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved or embodied by hardware, software, or a combination of hardware and software, and integrated into at least one module.

In the disclosure, at least one among a plurality of elements refers to not only all the plurality of elements but also both each one of the plurality of elements excluding the other elements and a combination thereof. That the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

In addition, the term of "and/or" includes a plurality of combinations of relevant items or any one item among a plurality of relevant items. For example, the scope of the expression or phrase "A and/or B" includes the item "A", the item "B", and the combination of items "A and B".

When it is stated in the disclosure that one element is "connected to" or "coupled to" another element, the expression encompasses an example of a direct connection or direct coupling, as well as a connection or coupling with another element interposed therebetween.

Aspects of the disclosure relate to an electronic apparatus improved in a speech-recognition efficiency and a control method thereof.

According to examples of the disclosure described herein, an electronic apparatus raises a success rate of speech recognition even under various conditions and apparatus environments, thereby enhancing speech-recognition reliability of the apparatus and making it more convenient for a user to use a speech recognition function.

According to examples of the disclosure described herein, an electronic apparatus is improved in reliability of speech recognition, thereby increasing utilization of various functions to be performed based on the speech recognition.

FIG. 1 illustrates a system according to an embodiment of the disclosure.

FIG. 1 illustrates a plurality of recognition apparatuses 10, which includes an electronic apparatus 100, and external apparatuses 101, 102, . . . , and a user 20.

The plurality of recognition apparatuses 10 refers to apparatuses of which speech recognition functions are activated by the same trigger word within the same network. As shown in FIG. 1, the plurality of recognition apparatuses 10 may include a display apparatus capable of displaying an image, or by an apparatus including no display.

For example, the plurality of recognition apparatuses 10 may include a television (TV), an artificial intelligence (AI) assistance device (an AI loudspeaker, etc.), a computer, a smartphone, a tablet personal computer (PC), a laptop computer, various displays such as a head mounted display (HMD), a near eye display (NED), a large format display (LFD), a digital signage, a digital information display (DID), a video wall, a projector display, a quantum dot (QD) display panel, quantum dot light-emitting diodes (QLED), micro light-emitting diodes (μLED), a mini LED, etc., a camera, a camcorder, a wearable device, an electronic photo frame, an electronic frame, and so on.

Further, the plurality of recognition apparatuses 10 may include various kinds of apparatuses such as a set-top box with no display, and the like image processing apparatus, a refrigerator, a Bluetooth loudspeaker, a washing machine, and other kinds of home appliances, a computer nd other kinds of information processing apparatuses, and so on.

According to the disclosure, the electronic apparatus 100 and the external apparatuses 101, 102, . . . may be on an equal footing, and may equivalently perform functions according to the disclosure. However, for convenience and easy understanding of the disclosure, the electronic apparatus 100 will be described. As described herein, a system with the plurality of recognition apparatuses may include the electronic apparatus 100 and at least one external apparatus.

When a user 20 utters a trigger word, the plurality of recognition apparatuses 10 using the uttered trigger word identifies the trigger word. In this case, the recognition apparatus for recognizing a speech command to be subsequently received is selected based on a noise level of the trigger word. The noise level according to the disclosure refers to the uttered trigger word's own utterance level, a non-utterance level obtained by measuring noise between receipt time of the trigger word and receipt time of the speech command, a signal-to-noise ratio (SNR) between the utterance level and the non-utterance level, etc.

For example, in FIG. 1 when the electronic apparatus 100 is identified as the most suitable recognition apparatus among the plurality of recognition apparatuses 10, which identify the trigger word of the user 20, based on the noise level of the trigger word, the electronic apparatus 100 receives the speech command of the user 20 after the trigger word. However, valid utterance may be received with non-utterance when the electronic apparatus 100 receives the speech command because of sounds output from the external apparatuses 101, 102, . . . other than the electronic apparatus 100 when the electronic apparatus 100 receives the speech command, for example, music from the external apparatus 101, e.g., a loudspeaker, noise from the external apparatus 102, e.g., a refrigerator, etc. Thus, reliability of speech-command recognition is decreased.

To solve this problem, the disclosure describes a method of recognizing a speech command by one of the external apparatuses 101, 102, . . . which has a higher success rate of speech recognition than the electronic apparatus 100 based on the noise level of the speech command.

In other words, an apparatus for carrying out a speech command and a recognition apparatus for recognizing the speech command are separated as necessary, thereby finding the optimal speech recognition combination to increase the success rate of the speech recognition. For example, according to the disclosure, it is taken into account that the plurality of recognition apparatuses are varied in speech recognition rate depending on various environments, so that an apparatus, which has an optimal speech recognition rate at a point in time when the speech recognition is performed, can recognize a speech. Further, various conditions of the recognition apparatuses, which participate in speech recognition, such as the closest position to a user, etc. are reflected in the speech recognition, thereby obtaining an optimal recognition result. In addition, various recognition results from a plurality of recognition apparatuses may be sorted out or used overall used to thereby obtain an optimal recognition result. A technical implementation method will be described in more detail later.

Figure 2:
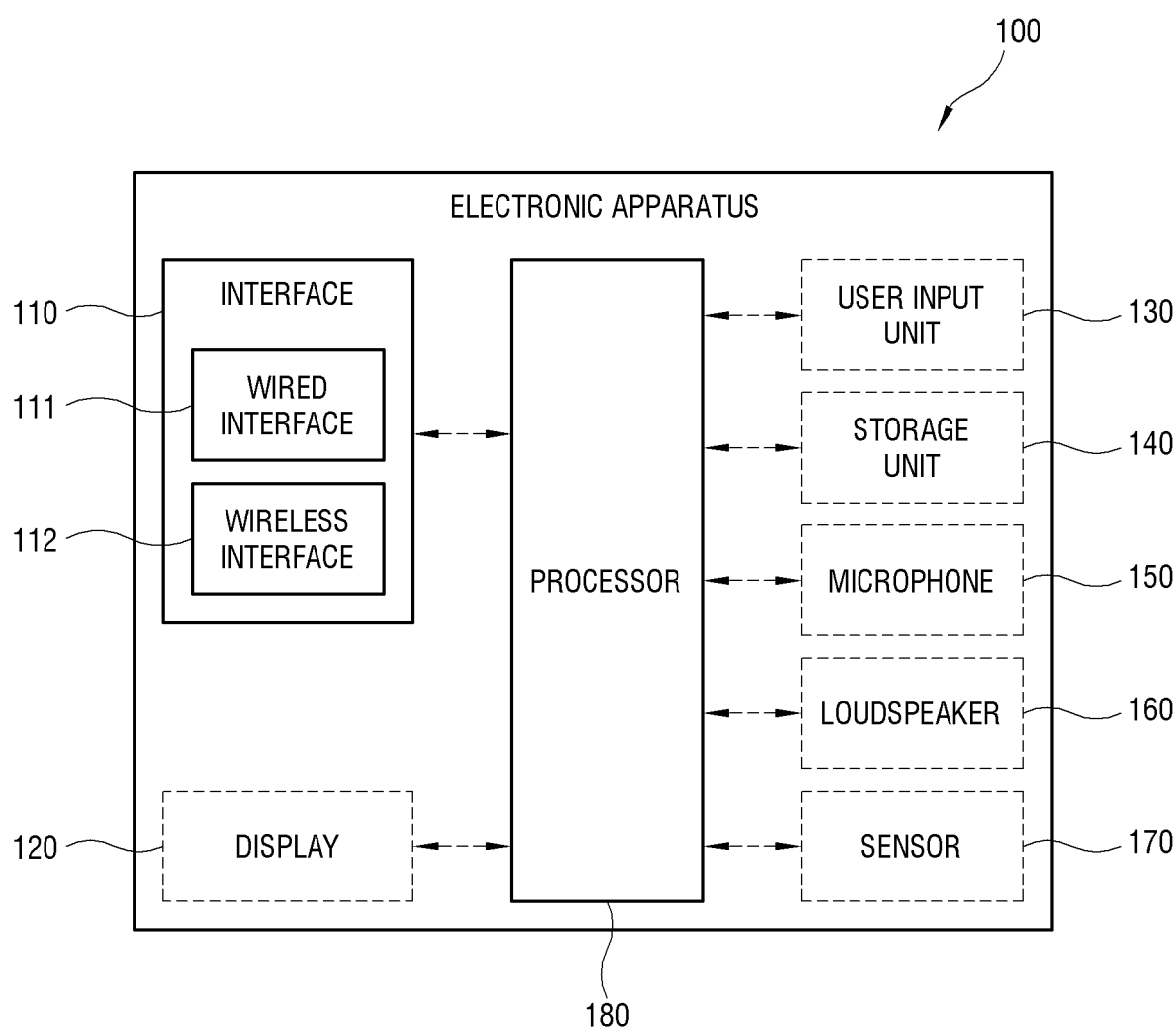
FIG. 2 is a block diagram of an electronic apparatus according to an embodiment of the disclosure.

FIG. 2 is a block diagram of an electronic apparatus according to an embodiment of the disclosure.

As shown in FIG. 2, the electronic apparatus 100 may include an interface 110.

The interface 110 may include a wired interface 111. The wired interface 111 may include a connector or port to which an antenna for receiving a broadcast signal based on a terrestrial/satellite broadcast or the like broadcast standards is connectable, a cable for receiving a broadcast signal based on cable broadcast standards is connectable, and the like, including combinations thereof. The electronic apparatus 100 may include a built-in antenna for receiving a broadcast signal. The wired interface 111 may include a connector, a port, etc. based on video and/or audio transmission standards, like an HDMI port, DisplayPort, a DVI port, a thunderbolt, composite video, component video, super video, syndicat des constructeurs des appareils radiorécepteurs et téléviseurs (SCART), etc. The wired interface 111 may include a connector, a port, etc. based on universal data transmission standards like a universal serial bus (USB) port, etc. The wired interface 111 may include a connector, a port, etc. to which an optical cable based on optical transmission standards is connectable. The wired interface 111 may include a connector, a port, etc. to which an external microphone or an external audio device including a microphone is connected, and which receives or inputs an audio signal from the audio device. The wired interface 111 may include a connector, a port, etc. to which a headset, an ear phone, an external loudspeaker or the like audio device is connected, and which transmits or outputs an audio signal to the audio device. The wired interface 111 may include a connector or a port based on Ethernet or the like network transmission standards. For example, the wired interface 111 may be embodied by a local area network (LAN) card or the like connected to a router or a gateway by a wire. The wired interface 111 may include various combinations of the described example embodiments.

The wired interface 111 may be connected to a set-top box, an optical media player or the like external apparatus or an external display apparatus, a loudspeaker, a server, etc. by a cable in a manner of one to one or one to N (where, N is a natural number) through the connector or the port, thereby receiving a video/audio signal from the corresponding external apparatus or transmitting a video/audio signal to the corresponding external apparatus. The wired interface 111 may include connectors or ports to individually transmit video/audio signals.

Further, according to an embodiment, the wired interface 111 may be embodied as built in (integrated in) the electronic apparatus 100, or may be embodied in the form of a dangle or a module and detachably connected to the connector of the electronic apparatus 100.

The interface 110 may include a wireless interface 112. The wireless interface 112 may be embodied variously corresponding to a type or function of the electronic apparatus 100. For example, the wireless interface 112 may use wireless communication based on radio frequency (RF), Zigbee, Bluetooth, Wi-Fi, ultra-wideband (UWB), near field communication (NFC), etc., and combinations thereof. The wireless interface 112 may be embodied by a wireless communication module that performs wireless communication with an access point (AP) based on Wi-Fi, a wireless communication module that performs one-to-one direct wireless communication such as Bluetooth, etc., and combinations thereof. The wireless interface 112 may wirelessly communicate with a server on a network to thereby transmit and receive a data packet to and from the server. The wireless interface 112 may include an infrared (IR) transmitter and/or an IR receiver to transmit and/or receive an IR signal based on IR communication standards. The wireless interface 112 may receive or input a remote control signal from a remote controller or other external devices, or transmit or output the remote control signal to other external devices through the IR transmitter and/or IR receiver. Alternatively, the electronic apparatus 100 may transmit and receive the remote control signal to and from the remote controller or other external devices through the wireless interface 112 based on Wi-Fi. Bluetooth or the like other standards.

The electronic apparatus 100 may further include a tuner to be tuned to a channel of a received broadcast signal, when a video/audio signal received through the interface 110 is a broadcast signal.

When the electronic apparatus 100 is embodied by a display apparatus, the electronic apparatus 100 may include a display 120. The display 120 may include an image on a screen. The display 120 has a light-receiving structure like a liquid crystal type or a light-emitting structure like an OLED type. The display 120 may include an additional component according to a type of the display 120. For example, when the display 120 is of the liquid crystal type, the display 120 may include a liquid crystal display (LCD) panel, a backlight unit for emitting light, a panel driving substrate for driving the liquid crystal of the LCD panel.

The electronic apparatus 100 may include a user input unit 130. The user input unit 130 may include various kinds of input interface circuits for receiving a user's input. The user input unit 130 may be variously embodied according to a type of electronic apparatus 100, and may, for example, include mechanical or electronic buttons of the electronic apparatus 100, a remote controller separated from the electronic apparatus 100, an input unit of external device connected to the electronic apparatus 100, a touch pad, a touch screen installed in the display 120, etc., and combinations thereof.

The electronic apparatus 100 may include a storage unit 140. The storage unit 140 may be configured to store digitalized data. The storage unit 140 may include a non-volatile storage which retains data regardless of whether power is on or off, and a volatile memory to which data to be processed by the processor 180 is loaded and which retains data only when power is on. The storage includes a flash-memory, a hard-disc drive (HDD), a solid-state drive (SSD) a read only memory (ROM), etc. and the memory includes a buffer, a random access memory (RAM), etc., and combinations thereof.

The storage unit 140 may be configured to store information about an AI model including a plurality of layers. Here, to store the information about the AI model includes storing various pieces of information related to operations of the AI model, for example, information about the plurality of layers included in the AI model, information about parameters (e.g. a filter coefficient, a bias, etc.) used in the plurality of layers, etc. For example, the storage unit 140 may be configured to store information about an AI model learned to obtain upscaling information of an input image (or information related to speech recognition, information about objects in an image, etc.) according to an embodiment. When the processor is embodied by hardware dedicated for the AI model, the information about the AI model may be stored in a built-in memory of the processor.

The electronic apparatus 100 may include a microphone 150. The microphone 150 collects a sound of an external environment such as a user's speech. The microphone 150 transmits a signal of the collected sound to the processor 180. The electronic apparatus 100 may include the microphone 150 to collect a user's speech, or receive a speech signal from an external apparatus such as a smartphone, a remote controller with a microphone, etc. through the interface 110. The external apparatus may be installed with a remote control application to control the electronic apparatus 100 or implement a function of speech recognition, etc. The external apparatus with such an installed application can receive a user's speech, and perform data transmission/reception and control through Wi-Fi/BT or infrared communication with the electronic apparatus 100, and thus a plurality of interfaces 110 for the communication may be included in the electronic apparatus 100.

The electronic apparatus 100 may include a loudspeaker 160. The loudspeaker 160 outputs a sound based on audio data processed by the processor 180. The loudspeaker 160 may include a unit loudspeaker (e.g., integrated in the electronic apparatus 100) so as to correspond to audio data of a certain audio channel, and may include a plurality of unit loudspeakers respectively corresponding to audio data of a plurality of audio channels. Alternatively, the loudspeaker 160 may be provided separately from the electronic apparatus 100, and in this case the electronic apparatus 100 may transmit audio data to the loudspeaker 160 through the interface 110.

The electronic apparatus 100 may include a sensor 170. The sensor 170 may detect the state of the electronic apparatus 100 or the surrounding states of the electronic apparatus 100, and transmit the detected information to the processor 180. The sensor 170 may include, but is not limited to, at least one of a magnetic sensor, an acceleration sensor, a temperature/moisture sensor, an infrared sensor, a gyroscope sensor, a positioning sensor (e.g. a global positioning system (GPS)), a barometer, a proximity sensor, and a red/green/blue (RGB) sensor (e.g. an illuminance sensor), and combinations thereof. Functions of the sensors described herein are known and can be deduced from their names, and thus detailed descriptions thereof will be omitted. The processor 180 may store a detected value defined by a tap between the electronic apparatus 100 and the external apparatus 200 in the storage unit 140. When a user event is detected, the processor 180 may identify whether the user event occurs or not based on whether the detected value matches the stored value.

The electronic apparatus 100 may include the processor 180. The processor 180 may include one or more hardware processors embodied by a CPU, a chipset, a buffer, a circuit, etc. mounted onto a printed circuit board, and may also be designed as a system on chip (SOC). The processor 180 may include modules corresponding to various processes, such as a demultiplexer, a decoder, a scaler, an audio digital signal processor (DSP), an amplifier, etc. when the electronic apparatus 100 is embodied by a display apparatus. Here, some or all of the modules may be embodied as the SOC. For example, the demultiplexer, the decoder, the scaler, and the like modules related to video processing may be embodied as a video processing SOC, and the audio DSP may be embodied as a chipset separated from the SOC.

The processor 180 may perform control to process input data, based on the AI model or operation rules previously defined in the storage unit 140. Further, when the processor 180 is an exclusive processor (or a processor dedicated for the AI), the processor 180 may be designed to have a hardware structure specialized for processing a specific AI model. For example, the hardware specialized for processing the specific AI model may be designed as an application specific integrated circuit (ASIC), a field-programmable gate array (FPGA), or the like hardware chip.

The output data may be varied depending on a type of AI model. For example, the output data may include, but is not limited to, an image improved in resolution, information about an object contained in the image, a text corresponding to a speech, etc., and combinations thereof.

When a speech signal of a user's speech is obtained through the microphone 150 or the like, the processor 180 may convert the speech signal into speech data. In this case, the speech data may be text data obtained through a speech-to-text (STT) process of converting a speech signal into the text data. The processor 80 may identify a command indicated by the speech data, and perform an operation based on the identified command. Both the process of the speech data and the process of identifying and carrying out the command may be performed in the electronic apparatus 100. However, in this case, the system load needed for the electronic apparatus 100 and required storage capacity are relatively increased, and therefore at least a part of the process may be performed by at least one server connected for communication with the electronic apparatus 100 through a network.

The processor 180 according to the disclosure may call and execute at least one instruction among instructions for software stored in a storage medium readable by the electronic apparatus 100 or the like machine. This enables the electronic apparatus 100 and the like machine to perform at least one function based on the at least one called instruction. The one or more instructions may include a code created by a compiler or a code executable by an interpreter. The machine-readable storage medium may be provided in the form of a non-transitory storage medium. Here, the term 'non-transitory' merely means that the storage medium is tangible and does not include a signal (for example, an electromagnetic wave), and this term does not distinguish between cases where data is semi-permanently and temporarily stored in the storage medium.

Meanwhile, the processor 180 may use machine learning, a neural network, a deep learning algorithm, and combinations thereof, as a rule-based or AI algorithm to perform at least part of data analysis, process, and result information generation to identify a first noise level corresponding to a received first user speech when the first user speech is a trigger word, identify a first recognition apparatus having a high first noise level among the plurality of recognition apparatuses including the electronic apparatus and at least one external apparatus in which the first user speech is identified as the trigger word, and perform a control operation of implementing a function corresponding to a second user speech by a second recognition apparatus, which has a high second noise level corresponding to the second user speech received after the first user speech, among the plurality of recognition apparatuses.

An AI system refers to a computer system that has an intelligence level of a human, in which a machine learns and determines by itself and recognition rates are improved the more it is used The AI technology is based on technology by utilizing machine learning (deep learning) technology and machine learning algorithms using an algorithm of autonomously classifying/learning features of input data to copy perception, determination, and the like functions of a human brain.

The technology may for example include at least one of linguistic comprehension technology for recognizing a language/text of a human, visual understanding technology for recognizing an object like a human sense of vision, deduction/prediction technology for identifying information and logically making deductions and predictions, knowledge representation technology for processing experience information of a human into knowledge data, and motion control technology for controlling a vehicle's automatic driving or a robots motion.

The linguistic comprehension refers to technology of recognizing and applying/processing to a human's language/character, and includes natural language processing, machine translation, conversation system, question and answer, speech recognition/synthesis, etc., and combinations thereof. The visual understanding refers to technology of recognizing and processing an object like a human sense of vision, and includes object recognition, object tracking, image search, people recognition, scene understanding, place understanding, image enhancement, etc. and combinations thereof. The deduction/prediction refers to technology of identifying information and logically making prediction, and includes knowledge/possibility-based deduction, optimized prediction, preference-based plan, recommendation, etc., and combinations thereof. The knowledge representation refers to technology of automating a human's experience information into knowledge data, and includes knowledge building (data creation/classification), knowledge management (data utilization), etc., and combinations thereof.

For example, the processor 180 may function as both a learner and a recognizer. The learner may implement a function of generating the learned neural network, and the recognizer may implement a function of recognizing (or deducing, predicting, estimating and identifying) the data based on the learned neural network.

The learner may generate or update the neural network. The learner may obtain learning data to generate the neural network. For example, the learner may obtain the learning data from the storage unit 140 or from the outside. The learning data may include data used for learning the neural network, and the data subjected to the foregoing operations may be used as the learning data to make the neural network learn.

Before making the neural network learn based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weight values, and performs neural network calculation through calculation between the calculation result of the previous layer and the plurality of weight values. The plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage unit 140 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The learning and training data for the AI model may be created through an external server. However, it will be appreciated that, as necessary, the learning of the AI model may be achieved in the electronic apparatus, and the learning data may also be created in the electronic apparatus.

For example, the method of controlling the electronic apparatus 100 according to the disclosure may be provided as included in a computer program product. The computer program product may include instructions of software to be executed by the processor 180 as described above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

Figure 3:
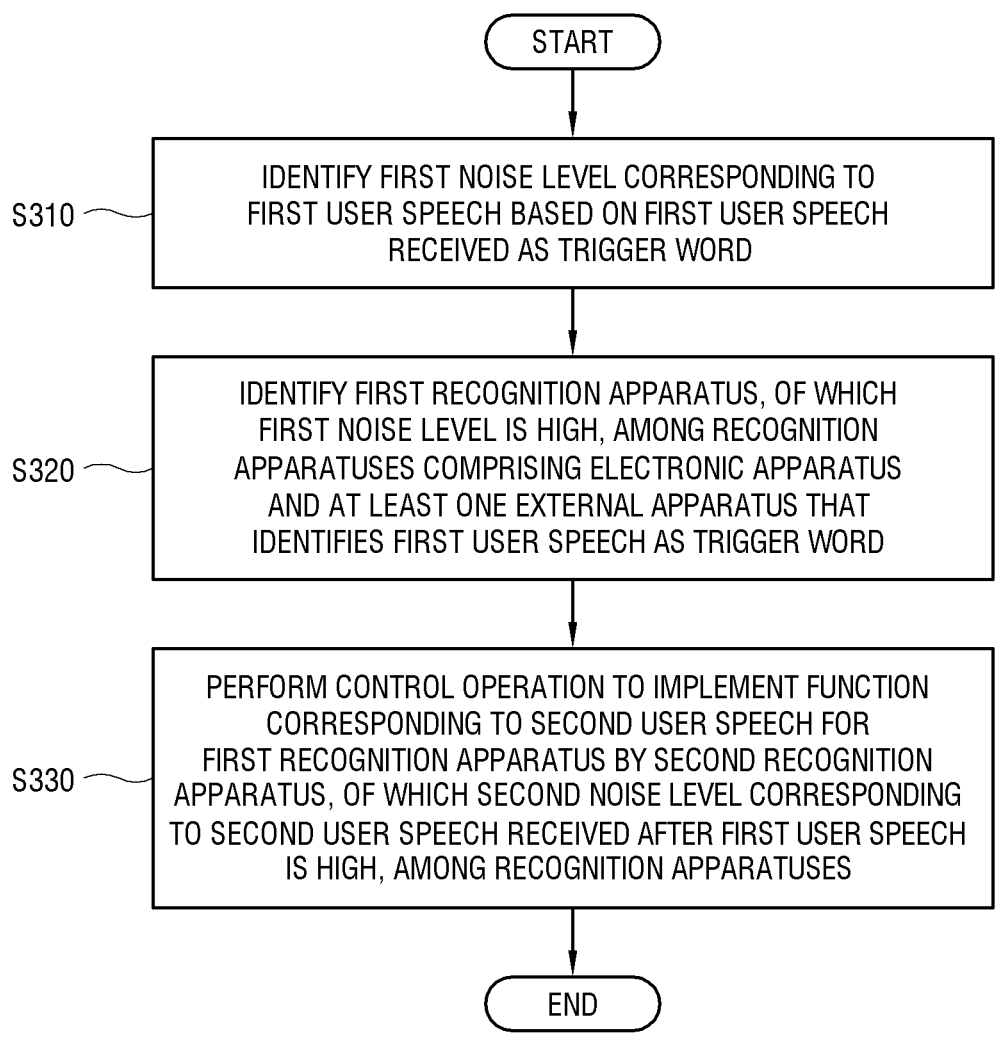
FIG. 3 is an operation flowchart of an electronic apparatus according to an embodiment of the disclosure.

FIG. 3 is an operation flowchart of an electronic apparatus according to an embodiment of the disclosure.

In this flowchart, it is assumed as described above with reference to FIG. 1 that a plurality of recognition apparatuses 10, which share the same network and use the same trigger word for activating a speech recognition function, is present n a certain space.

According to an embodiment of the disclosure, the processor 180 identifies a first noise level corresponding to a received first user speech when the first user speech is a trigger word (S310).

The processor 180 identifies whether the first user speech is the trigger word, based on information such as a signal waveform, a length, etc. of the trigger word. In this case, the processor 180 may use information previously stored in the storage unit 140, or obtain information through communication with a server or the like.

When it is identified that the received first user speech is the trigger word, the processor 180 identifies a first noise level corresponding to the first user speech. At this time, at least one external apparatus, which is present around the electronic apparatus 100 and identifies the first user speech as the trigger word, also identifies its own first noise level. The noise level according to the disclosure is the same as described above with reference to FIG. 1.

In the case of the trigger word, the utterance level is more important that the non-utterance level. Therefore, the processor 180 may identify the first noise level based on the utterance level of the first user speech. However, without limitations, it is enough to identify the first noise level by which an optimal recognition apparatus for performing the speech recognition function is identified.

According to an embodiment of the disclosure, the processor 180 identifies a first recognition apparatus having a high first noise level among the plurality of recognition apparatuses which include the electronic apparatus and at least one external apparatus (S320).

A high noise level means that an uttered trigger word's own utterance level is high, a non-utterance level is low, or a ratio of the utterance level to the non-utterance level, i.e., a SNR is high. Therefore, the processor 180 identifies a recognition apparatus corresponding to the first user speech, i.e., a recognition apparatus a user wants to use, as it has a higher first noise level. Further, it is identified that the higher the first noise level, the higher the success rate of the speech recognition.

There may be various techniques for identifying a first recognition apparatus, of which the first noise level is high, among the plurality of recognition apparatuses.

For example, the processor 180 may receive the first noise level of the external apparatus from at least one external apparatus through the interface 110, compare the first noise level of at least one external apparatus with the first noise level identified by the processor 180, and identify the first recognition apparatus, of which the first noise level is high (e.g., the highest), among the plurality of recognition apparatuses. To this end, each recognition apparatus may individually perform identification to identify whether itself is the first recognition apparatus, of which the first noise level is high, among the plurality of recognition apparatuses.

Further, as described with reference to FIG. 9, each recognition apparatus may transmit the identified first noise level to a server, and the server selects the first recognition apparatus of which the first noise level is high, and transmits information about the selection to the recognition apparatuses, thereby identifying the first recognition apparatus.

The processor 180 performs control operations to implement a function corresponding to a second user speech for the first recognition apparatus by a second recognition apparatus, of which a second noise level corresponding to the second user speech received after the first user speech is high, among the plurality of recognition apparatuses (S330).

According to the disclosure, the second user speech refers to a speech corresponding to a speech command, which is received after the first user speech, and a speech about a function to be ultimately implemented in the first recognition apparatus by a user. For example, the second user speech may include "channel up" when the first recognition apparatus is a TV, "volume up" when the first recognition apparatus is a loudspeaker, and "temperature down" when the first recognition apparatus is a refrigerator, and so on.

For example, when the first recognition apparatus is identified as a TV and the processor of the first recognition apparatus receives and recognizes the second user speech of "channel up", the second user speech is received together with sounds output from apparatuses other than the first recognition apparatus, for example, music from the loudspeaker and noise from the refrigerator, and it is thus difficult to recognize the signal of "channel up".

To achieve this, the processor 180 identifies the second noise level of the second user speech, and identifies a second recognition apparatus, of which the second noise level is high, among the plurality of recognition apparatuses. The method of identifying the second noise level of the second user speech and the method of identifying the second recognition apparatus having a high second noise level are the same as the foregoing method of identifying the first noise level of the first user speech and the method of identifying the first recognition apparatus having a high first noise level.

In this case, to more efficiently receive a speech command through a certain recognition apparatus among the plurality of recognition apparatuses of which the speech recognition functions are activated by the trigger word, the processor 180 may place emphasis on the non-utterance level and identify the second noise level based on the non-utterance level of the second user speech. Further, an apparatus to be used as the second recognition apparatus is increased in the recognition rate as a user's utterance level gets higher and the received noise becomes smaller. Therefore, an apparatus to be used as the second recognition apparatus has a high utterance level of a user's speech and a low non-utterance level. When apparatuses have utterance levels much lower than the utterance level identified by the first recognition apparatus even though their non-utterance levels are low, it is identified that the apparatuses are far away from a user. Thus, candidates are selected excluding such apparatuses. However, like the first noise level, without limitation enough to identify the second noise level by which an optimal second recognition apparatus for performing the speech recognition function is identified.

The processor of the apparatus identified as the second recognition apparatus performs control operations to carry out a function corresponding to the second user speech with regard to the first recognition apparatus.

The disclosure describes a method of identifying a suitable speech recognition apparatus based on real-time speech recognition results of a user's utterance in the speech recognition apparatus. With this, the electronic apparatus is improved in reliability of speech recognition, thereby increasing utilization of various functions to be performed based on the speech recognition.

Figure 4:
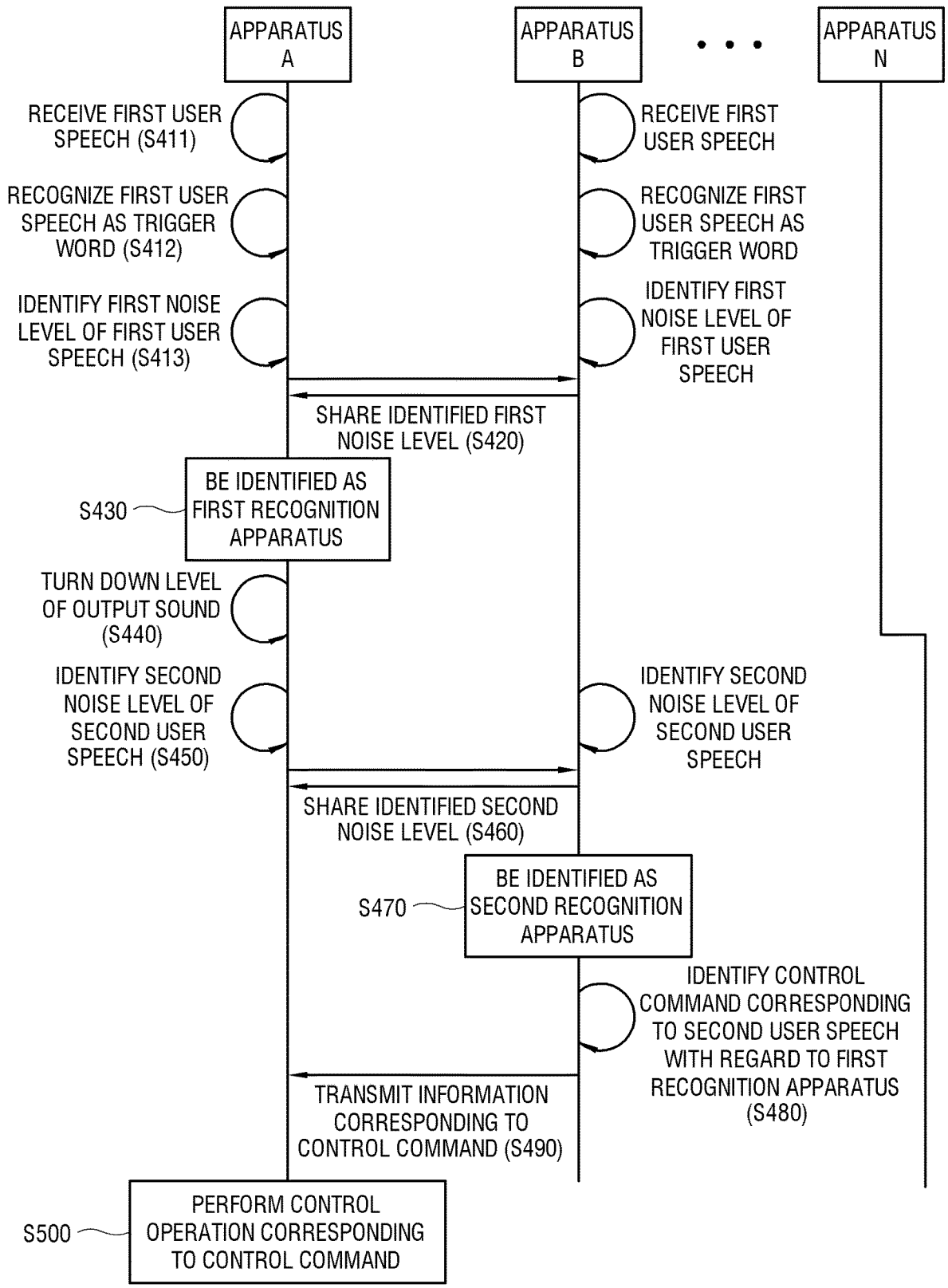
FIG. 4 is an operation flowchart of an electronic apparatus according to an embodiment of the disclosure.

FIG. 4 is an operation flowchart of an electronic apparatus according to an embodiment of the disclosure.

In this flowchart, it is assumed as described above with reference to FIG. 1 that a plurality of recognition apparatuses 10 such as an apparatus A, an apparatus B . . . an apparatus N, which share the same network and use the same trigger word for activating a speech recognition function, is present in a certain space. Repetitive descriptions to those described in FIG. 3 will be avoided.

As described above in S310 of FIG. 3, processors of the apparatus A, the apparatus B . . . the apparatus N receive a first user speech (S411), recognize the first user speech as the trigger word (S412), and identify a first noise level of the first user speech (S413).

The processors of the apparatus A, the apparatus B . . . the apparatus N share their identified first noise levels (S420). FIG. 4 simply illustrates sharing between only the apparatus A and the apparatus B, but all the apparatuses share their identified first noise levels with one another.

The processor of the apparatus A compares its own identified first noise level with the first noise levels received from the apparatus B . . . the apparatus N, and identifies the apparatus A as the first recognition apparatus when it is identified that the apparatus A has the highest first noise level (S430). In this case, the other processors of the apparatus B and the apparatus N also compare their own identified first noise levels with the first noise levels received from different apparatuses, and identifies that they are not the first recognition apparatus as it is identified that they do not have the highest first noise level.

However, according to the disclosure, it is hardly regarded that the whole operations of the speech recognition are terminated even when the apparatus identifies itself as the first recognition apparatus because the first user speech and the second user speech are not unconditionally processed in sequence, and the operations of identifying the first recognition apparatus and the second recognition apparatus, performing the speech recognition through the second recognition apparatus, and implementing the function through the first recognition apparatus are carried out for a very short period of time. Therefore, when the speech recognition function is activated through the first user speech, all the apparatuses receive the second user speech regardless of whether or not they are identified as the first recognition apparatus, unless otherwise designated.

When the apparatus A is identified as the first recognition apparatus, the processor of the apparatus A may perform control to turn down a level of a sound output through the loudspeaker connected to the apparatus A (S440). This is to make it easier to receive the speech command received after the first user speech, i.e., the second user speech.

Below, it will be assumed that the level of the sound output from the apparatus A identified as the first recognition apparatus is turned down, but it is hard for the processor of the apparatus A to recognize the second user speech, i.e., the speech command because other apparatuses than the apparatus A operate.

For example, in the case where the apparatus A is the TV, the processor of the TV turns down the level of the sound output from the TV itself in order to receive and recognize the second user speech of "channel up", but the recognition rate of the signal of "channel up" may be decreased because the signal is received together with music from the apparatus B, e.g., the loudspeaker, noise from the apparatus C, e.g., the refrigerator other than from the first recognition apparatus.

To solve this problem, the processors of the apparatus A, the apparatus B, . . . , the apparatus C identify the second noise level of the second user speech (S450).

In this case, each processor of the apparatuses may perform auto echo cancellation (AEC) to remove a signal corresponding to a sound output through its own loudspeaker from a signal corresponding to a second user speech, when the second noise level is identified.

In the foregoing operation S440, the processor of the apparatus A identified as the first recognition apparatus performs control to turn down the level of the sound output through the loudspeaker connected to the apparatus A, and therefore the AEC in the apparatus A is less effective in increasing the second noise level. On the other hand, in the other apparatuses, the sound output from the apparatus A is removed, and the sounds output through their own apparatuses are also removed, thereby increasing the second noise level.

According to an alternative embodiment of the disclosure, the processor of the apparatus A may identify the apparatus A as the second recognition apparatus when the apparatus A is identified as the first recognition apparatus and the level of the sound from at least one external apparatus (the apparatus B, . . . , the apparatus N) is lower than a preset value. That the level of the sound from the external apparatus is lower than the preset value means that the external apparatuses output no sounds, or the identified non-utterance level s lower than the preset value and less effective in making the first recognition apparatus intactly receive the second user speech even though the external apparatuses output sounds.

The processors of the apparatus A, the apparatus B . . . the apparatus N share the identified second noise levels (S460). FIG. 4 simply illustrates sharing between only the apparatus A and the apparatus B, but all the apparatuses share their identified second noise levels with one another.

The processor of the apparatus B compares its own identified second noise level with the second noise levels received from the apparatus A and the apparatus N, and identifies the apparatus B as the second recognition apparatus when it is identified that the apparatus B has the highest second noise level (S470). Likewise, the processors of the other apparatuses also identify whether their own apparatuses are the second recognition apparatus.

The processor of the apparatus B identifies a control command corresponding to the second user speech with regard to the first recognition apparatus (S480). Eventually, an apparatus for performing the function corresponding to the second user speech is the first recognition apparatus identified to perform the function, and therefore the processor of the apparatus B identified as the second recognition apparatus identifies a control command corresponding to the second user speech with regard to the apparatus A, i.e., the first recognition apparatus. Details about the operation S480 will be described with reference to FIGS. 5 and 6.

The processor of the apparatus B transmits information corresponding to the identified control command to the apparatus A through the interface (S490).

The processor of the apparatus A performs a control operation corresponding to the control command based on information received from the apparatus B (S500).

According to an embodiment of the disclosure, it is possible to raise the success rate of the speech recognition even under various conditions and apparatus environments, thereby enhancing the speech-recognition reliability of the apparatus and making it more convenient for a user to use the speech recognition function.

Figure 5:
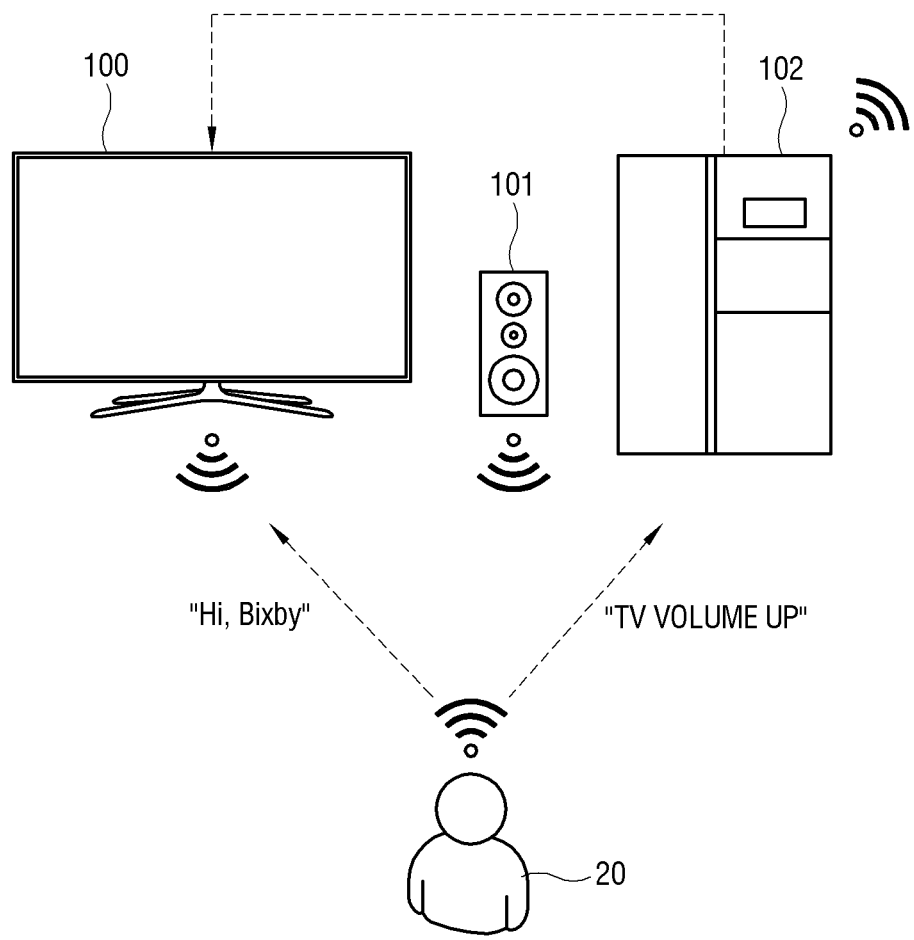
FIG. 5 illustrates operations of an electronic apparatus according to an embodiment of the disclosure.

FIG. 5 illustrates operations of an electronic apparatus according to an embodiment of the disclosure.

FIG. 5 shows an example in connection with the operation S330 in FIG. 3 and the operation S480 in FIG. 4. In FIG. 5, it will be assumed that a plurality of recognition apparatuses including the electronic apparatus 100, and the external apparatuses 101 and 102, in which the same network is shared among them and the speech recognition function is activated by the same trigger word, are present in a certain space (e.g., within a certain or predefined distance from each other). In this case, as shown therein, the electronic apparatus 100 is a TV, the external apparatus 101 is a loudspeaker, and the external apparatus 102 is a refrigerator.

When the user 20 utters a trigger word of "Hi, Bixby", the processors of the plurality of recognition apparatuses, which recognize "Hi, Bixby" as the trigger word, identify the first noise level, respectively.

The processor 180 of the electronic apparatus 100 may identify that the electronic apparatus 100 is the first recognition apparatus, based on the highest first noise level of the electronic apparatus 100 through comparison with the first noise levels of the external apparatuses 101 and 102.

Likewise, when the external apparatus 102 is identified as the second recognition apparatus based on the second noise level of "TV volume up" received after the utterance of "Hi, Bixby", the processor of the external apparatus 102 may perform a control operation to implement a function corresponding to the second user speech with regard to the electronic apparatus 100 identified as the first recognition apparatus. Therefore, the processor of the external apparatus 102 may transmit data or information obtained by receiving and processing a speech of "TV volume up" to the electronic apparatus 100 identified as the first recognition apparatus. The processor 180 identifies a control command corresponding to the speech command based on the received data or information, and performs a control operation. In other words, the processor 180 may turn up the volume of the loudspeaker connected to the electronic apparatus 100.

In this case, the external apparatus 101 is not identified as the first recognition apparatus based on comparison for the first noise level and not identified as the second recognition apparatus based on comparison for the second noise level even though it identifies the trigger word, and therefore terminates the speech recognition operation.

Figure 6:
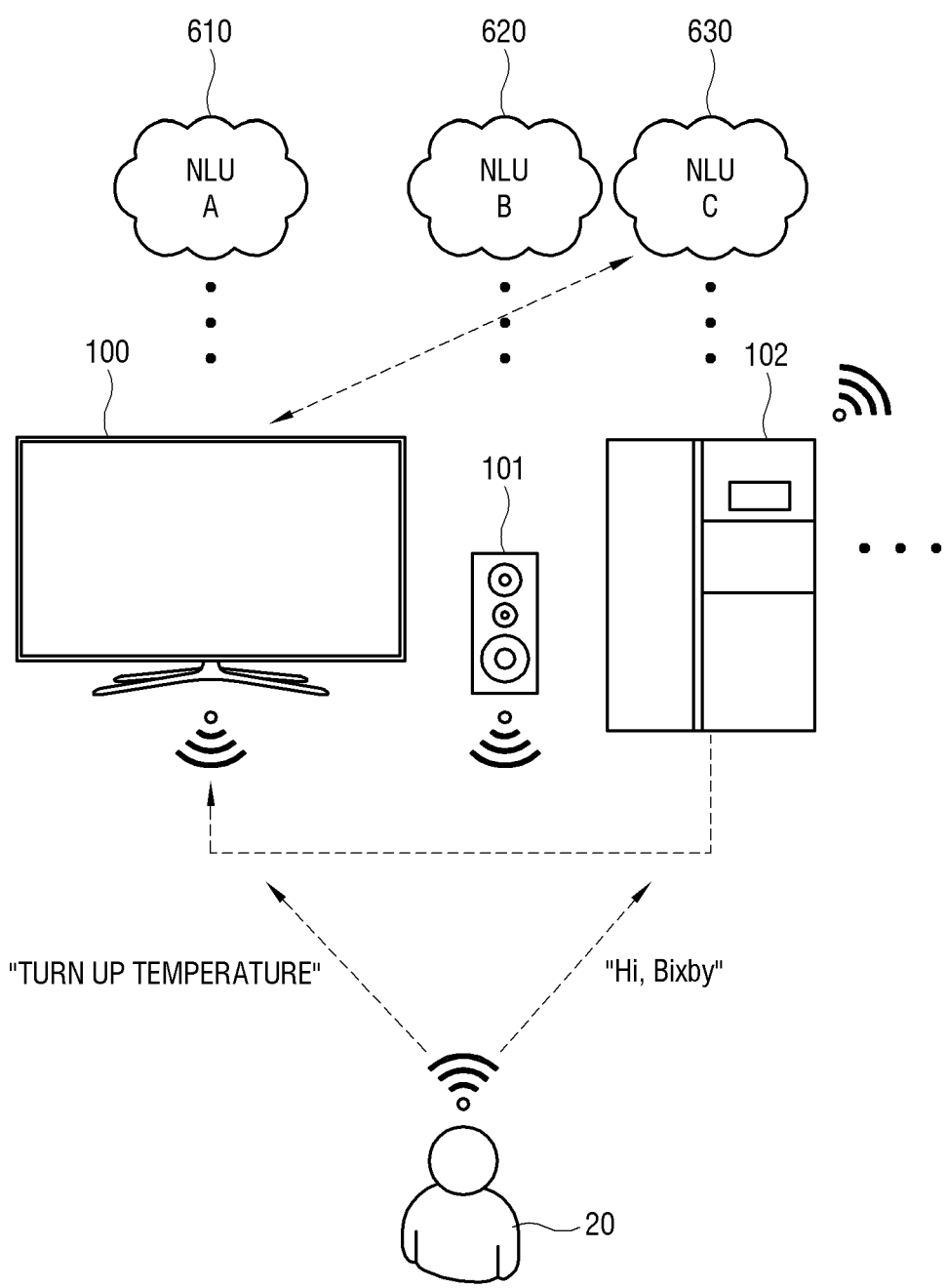
FIG. 6 illustrates operations of an electronic apparatus according to an embodiment of the disclosure.

FIG. 6 illustrates operations of an electronic apparatus according to an embodiment of the disclosure.

FIG. 6 shows that the processor 180 implements a function corresponding to the second user speech based on a natural language processing engine corresponding to the first recognition engine among a plurality of natural language processing engines corresponding to a plurality of recognition apparatuses as examples of the operation S330 in FIG. 3 and the operation S480 in FIG. 4.

Referring to FIG. 6, the processors of the recognition apparatuses 100, 101, 102, . . . may include natural language processing engines 610, 620, 630, . . . , respectively. The natural language processing engine refers to an engine for natural language understanding (NLU), and the processor 180 may use the natural language processing engine to deduce not only a user's utterance but also real meaning of the user's utterance. The natural language processing engine may be, but is not limited to, based on repetitive learning of a variety of data through AI technology, or based on rules.

In more detail, the processor 180 may receive a user's speech through the microphone 150 or the like, and obtain text data through an SIT process by which the received speech is converted into text data. The processor 180 identify a user's utterance intention in the obtained text data through the natural language processing engine.

For example, when the electronic apparatus 100 is a TV and the processor 180 obtains text data of "Is there any interesting program, these days?" by converting a user's speech into the text data, the processor 180 may deduce a request for a popular TV program through a natural language processing engine 610. Therefore, the processor 180 may identify a popular TV program, and display the corresponding TV program on the display 120 when the corresponding TV program is on air (being broadcast or streamed) or display a graphic user interface (GUI) including an earliest broadcasting time and a channel number in a TV guide on the display when the corresponding TV program is not on air (not being broadcast or streamed).

Further, according to an embodiment of the disclosure, it is significant as described above when there is a plurality of recognition apparatuses, and the first recognition apparatus for performing a function and the second recognition apparatus for recognizing a user's speech are different.

In an example with respect to FIG. 6, it is assumed that the user 20 utters a trigger word of "Hi, Bixby" and the external apparatus 102 of which the first noise level is high is identified as the first recognition apparatus, and the electronic apparatus 100 of which the second noise level based on a second user speech of "volume up" is high is identified as the second recognition apparatus.

The processor 180 converts the second user speech of "volume up" into text data through the STT process, and recognizes the second user speech based on a natural language processing engine 630 corresponding to the external apparatus 102, i.e., the first recognition apparatus among the plurality of natural language processing engines in order to recognize the text data. Further, the processor 180 transmits information about the control command corresponding to the second user speech to the first recognition apparatus, and controls the first recognition apparatus to implement a function corresponding to the second user speech.

Automatic speech recognition (ASR) may be performed in the natural language processing engine corresponding to the first recognition apparatus that actually performs an operation, because the recognition apparatuses are different n the recognition rate due to their various characteristics of the microphones even though the same audio format is used, and the recognition apparatuses having the natural language processing engines are different in operation characteristics. However, as necessary, the speech recognition may be performed in the natural language processing engine corresponding to the second recognition apparatus or another recognition apparatus based on product group similarity between the second recognition apparatus and the first recognition apparatus, the operation characteristics of the natural language processing engine, difficulty of a speech command, etc., and combinations thereof.

According to an embodiment of the disclosure, it is possible to more accurately obtain a control command because the control command is obtained understanding its meaning with respect to the natural language processing engine corresponding to the first recognition apparatus even though the first recognition apparatus for performing a function corresponding to a speech and the second recognition apparatus for recognizing the speech are different from each other.

Figure 7:
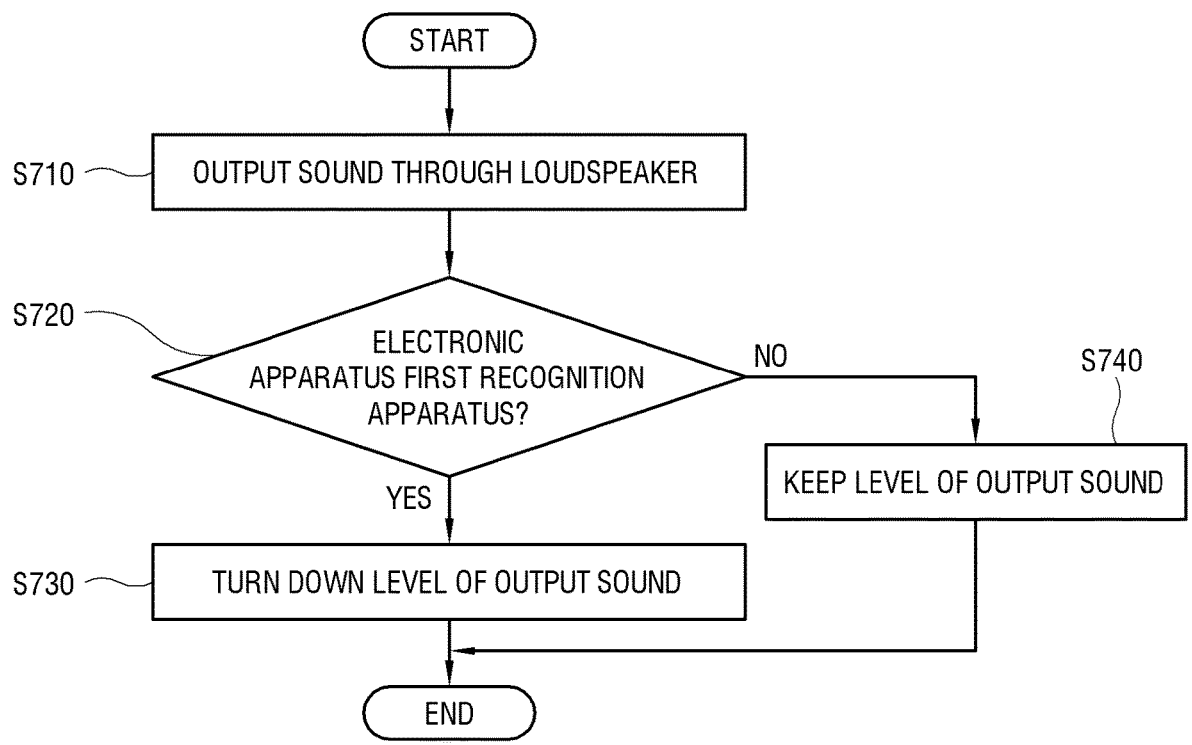
FIG. 7 illustrates an operation flowchart of an electronic apparatus according to an embodiment of the disclosure.

FIG. 7 illustrates an operation flowchart of an electronic apparatus according to an embodiment of the disclosure.

FIG. 7 shows an operation of the electronic apparatus in connection with the operation S440 of FIG. 4. The processor 180 of the electronic apparatus 100 outputs a sound through the connected loudspeaker (S710). In this case, the loudspeaker may include a loudspeaker 160 provided inside the electronic apparatus 100. Alternatively, the loudspeaker 160 may be provided separately from the electronic apparatus 100, and the processor 180 may transmit audio data to the loudspeaker 160 through the interface 110 so that the loudspeaker 160 can output the audio data.

According to an embodiment of the disclosure, the processor 180 identifies whether the electronic apparatus 100 is the first recognition apparatus (S720). When it is identified that the electronic apparatus 100 is the first recognition apparatus (see YES in S720), the processor 180 controls the level of the output sound to be turned down (S730).

When it is identified that the electronic apparatus 100 is not the first recognition apparatus (see NO in S720), the processor 180 controls the level of the output sound to be kept or maintained at the same level (S740).

According to an embodiment of the disclosure, when it is identified that the electronic apparatus 100 is the first recognition apparatus the level of the sound output from the loudspeaker connected to the electronic apparatus 100 is turned down, thereby providing a better environment for the speech recognition when a user speech corresponding to a subsequent speech command is received.

Figure 8:
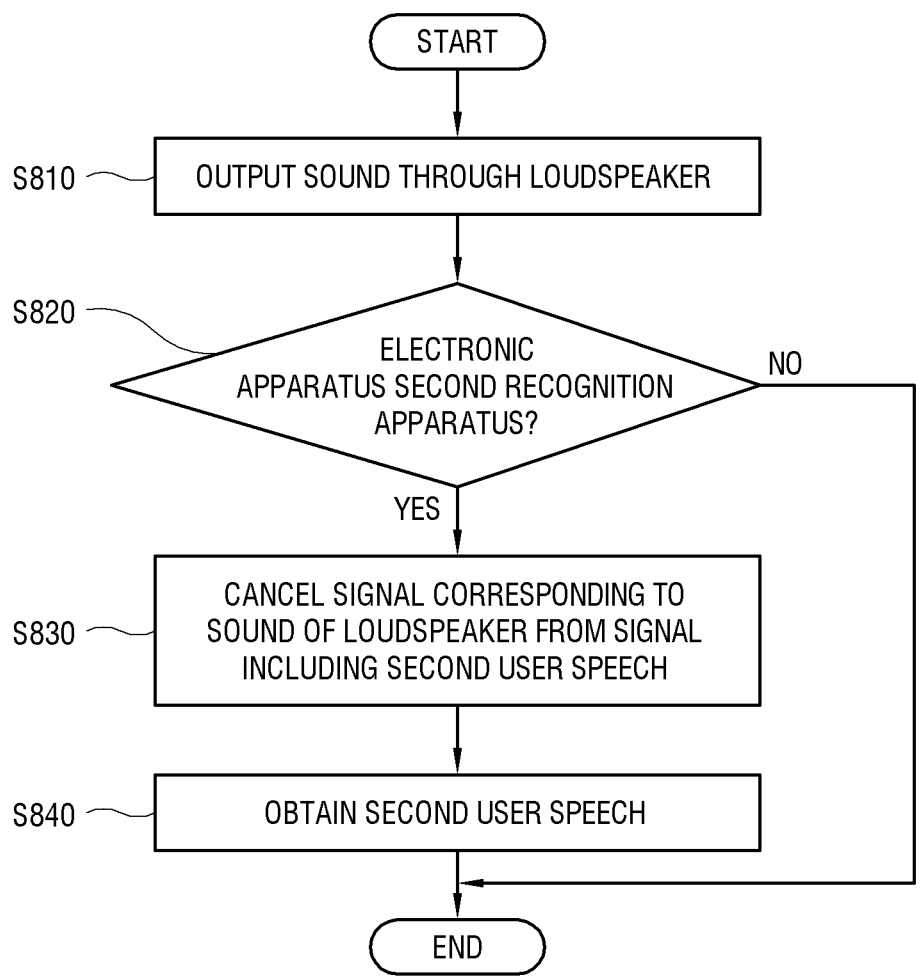
FIG. 8 illustrates an operation flowchart of an electronic apparatus according to an embodiment of the disclosure.

FIG. 8 illustrates an operation flowchart of an electronic apparatus according to an embodiment of the disclosure. FIG. 8 shows a detailed operation flowchart of the AEC described in the operation S450 of FIG. 4, and the operations in FIG. 8 are applied when the electronic apparatus 100 is not identified as the first recognition apparatus in the operation S740 of FIG. 7 and the level of the output sound is kept, thereby further improving the efficiency of the speech recognition.

The electronic apparatus 100 further includes the loudspeaker 160, and the processor 180 outputs a sound through the loudspeaker 160 (S810).

The processor 180 identifies whether the electronic apparatus 100 is the second recognition apparatus (S820). A method of identifying whether the electronic apparatus 100 is the second recognition apparatus is the same as described above.

When it is identified that the electronic apparatus 100 is the second recognition apparatus (see YES in S820), the processor 180 cancels a signal corresponding to the sound of the loudspeaker from a signal including a second user speech (S830). The processor 180 receives the second user speech together h the sound output from its own apparatus. The processor 180 cancels a sound output from the electronic apparatus 100 from a sound including the second user speech. Alternatively, the processor 180 may set an AEC function to run on background, thereby canceling its own sound before receiving the second user speech The processor 180 obtains the second user speech by canceling the sound of the electronic apparatus 100 from the sound including the second user speech (S840).

Figure 9:
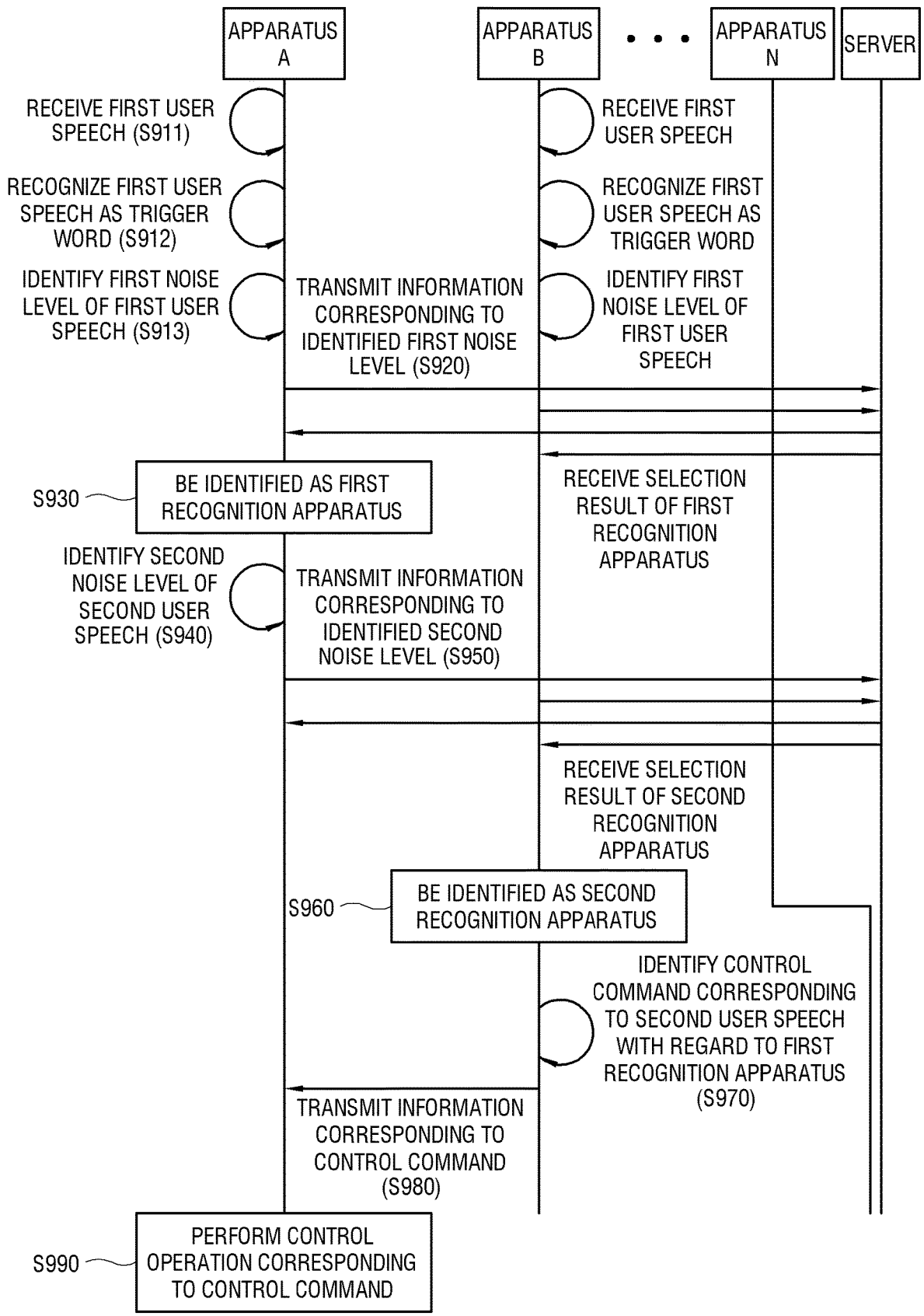
FIG. 9 illustrates an operation flowchart of an electronic apparatus according to an embodiment of the disclosure.

FIG. 9 illustrates an operation flowchart of an electronic apparatus according to an embodiment of the disclosure.

FIG. 9 shows an example of selecting the first recognition apparatus of which the first noise level is high or the second recognition apparatus of which the second noise level is high, as described above in the operation S420 of FIG. 4. Therefore, descriptions of operations S911, S912 S913 S940 S970, S980 and S990 of FIG. 9 corresponding to the operations S411, S412, S413, S450, S480, S490, S500 of FIG. 4 will be omitted.

The first noise levels and the second noise levels identified by the processors of the recognition apparatuses may be shared among the recognition apparatuses to separately select the first recognition apparatus and the second recognition apparatus, but the processors of the recognition apparatuses transmit information corresponding to the identified first noise level and the identified second noise levels to the server through the interface as shown in operations S920, S930, S950 and S960 of FIG. 9. The server compares the first noise levels based on the received information, and selects the recognition apparatus having the highest first noise level. The processors of the recognition apparatuses receive information including a result of selecting the first recognition apparatus from the server. The server compares the second noise levels based on the received information, and selects the recognition apparatus having the highest first noise level. The processors of the recognition apparatuses receive information including a result of selecting the second recognition apparatus from the server.

The server may select the first recognition apparatus of which the first noise level is high, and transmit selection information to the recognition apparatuses, thereby making the selection. Likewise, a result of selecting the second recognition apparatus based on the second noise level may similarly be performed. In another example, the second recognition apparatus may be selected as described with respect to the example of FIG. 10.

FIG. 10 illustrates an operation flowchart of an electronic apparatus according to an embodiment of the disclosure. FIG. 10 describes a solution when it is difficult to select a suitable second recognition apparatus because the second noise levels are similar as a result of identifying and comparing the second noise levels corresponding to the second user speech in the plurality of recognition apparatuses.

The processor 180 identifies the second noise level and receives information corresponding to the second noise level identified by at least one external apparatus through the interface 110 (S1010).

The processor 180 compares the identified second noise level and the second noise level based on the received information (S1020).

The processor 180 identifies whether the plurality of identified second noise levels from the plurality of recognition apparatuses are similar to one another (S1030).

In this case, the second noise levels are similar to each other means that a difference between the second noise levels is not higher than a preset value, and therefore means that the results of speech recognition are expected to be almost the same regardless of whichever recognition apparatus is selected as the second recognition apparatus When the second noise levels are similar to each other (see YES in S1030) the processor 180 may use various methods to select the second recognition apparatus in which the speech recognition will be performed. Detailed examples are as follows.

For example, the first recognition apparatus may be selected as the second recognition apparatus (S1040).

In other words, when the second recognition apparatus for more efficiently recognizing the speech is not identified among the plurality of recognition apparatuses, an apparatus selected as the first recognition apparatus for performing a function may be identified as the second recognition apparatus. In this case, the corresponding apparatus can perform recognition and then directly carry out an operation, thereby speeding up the speech recognition.

Alternatively, when the second noise levels are similar to each other (see YES in S1030), the processor 180 may implement a function corresponding to one recognition result based on a preset reference among a plurality of recognition results identified by the plurality of recognition apparatuses (S1050).

The preset reference may include the following examples: the processor 180 may overall consider not only the identified second noise level, but also, for example, a user's use history, a use timeslot, a surrounding temperature, a relation between an operation of an apparatus and utterance content implying the apparatus in the utterance content such as "TV volume up" or the like, a degree of matching between a received signal and a previously defined signal, etc., and combinations thereof, and select a recognition result deduced to correspond to the second user speech uttered by the user 20, thereby implementing the function.

Alternatively, the processor 180 may use the recognition result when the identified second noise level is higher than the preset value (S1060). It is identified that the recognition rate of the second user speech reaches a predetermined level not only when the second noise levels identified by the plurality of recognition apparatuses are similar to each other but also when the identified second noise level is higher than the preset value, and the recognition results of the recognition apparatuses, in which the identified second noise level is higher than or equal to the preset value, are all usable.

In addition, any method of identifying the second recognition apparatus which can obtain an optimal speech recognition results is employable when the identified second noise levels are similar.

The processor 180 identifies whether the second noise levels are similar to each other (S1030), and identifies an apparatus having the highest second noise level as the second recognition apparatus (S1070) when the second noise levels are not similar to each other (see NO in S1030).

In examples described herein, the plurality of recognition apparatuses 10 according to the disclosure include speech recognition functions which are activated by the same trigger word within a same network. However, the disclosure is not limited thereto and may also be applied to other recognition apparatuses as long as information is transmittable/receivable between recognition apparatuses of heterogeneous network. Further, a trigger word may be previously set without sharing the same trigger word among the plurality of recognition apparatuses, so that the recognition apparatus can perform the operations according to the disclosure in response to the input of the preset trigger word even though its own recognition trigger word is not input.

While the disclosure has been described with reference to example embodiments, it should be understood by those skilled in the art that various changes in form and details may be made without departing from the spirit and scope of the disclosure.

What is claimed is:

1. An electronic apparatus, comprising:
   a memory storing instructions; and
   a processor configured to execute the instructions to:
      based on a first user speech being received by the electronic apparatus and including a trigger word for activating a speech recognition function of the electronic apparatus, identify a first noise level corresponding to the first user speech received by the electronic apparatus,
      identify, from among a plurality of recognition apparatuses that each received the first user speech and have a speech recognition function that is activatable by the trigger word, a first recognition apparatus having a highest first noise level corresponding to the first user speech, wherein the plurality of recognition apparatuses includes the electronic apparatus,
      based on the identified first recognition apparatus being the electronic apparatus, turn down a level of sound output by the electronic apparatus and, while the level of sound output by the electronic apparatus is turned down, identify, from among the plurality of recognition apparatuses, a second recognition apparatus having a second noise level corresponding to a second user speech received by each recognition apparatus of the plurality of recognition apparatuses after the first user speech, and which is highest among the plurality of recognition apparatuses, wherein the second user speech includes a control command but does not include the trigger word, and based on the identified first recognition apparatus being the electronic apparatus and the identified second recognition apparatus not being the electronic apparatus and the control command corresponding to a function of the electronic apparatus, receive information from the identified second recognition apparatus indicating the control command included in the second user speech received by the identified second recognition apparatus and perform the function of the electronic apparatus in accordance with the received information.

2. The electronic apparatus according to claim 1, wherein the processor is configured to, based on the identified first recognition apparatus being the electronic apparatus and the identified second recognition apparatus not being the electronic apparatus and the control command corresponding to a function of the identified second recognition apparatus, recognize the control command using a natural language processing engine corresponding to the first recognition apparatus among a plurality of natural language processing engines respectively corresponding to the plurality of recognition apparatuses.

3. The electronic apparatus according to claim 1, wherein the processor is configured to, based on the identified first recognition apparatus being the electronic apparatus and a level of sound from at least one other recognition apparatus among the plurality of recognition apparatuses being lower than a preset value, identify the electronic apparatus as the second recognition apparatus.

4. The electronic apparatus according to claim 1, wherein the processor is configured to:
obtain the second user speech by canceling a signal corresponding to the sound output by the electronic apparatus from a signal including the second user speech based on the identified second recognition apparatus being the electronic apparatus.

5. The electronic apparatus according to claim 1, wherein the processor is configured to identify the first noise level based on an utterance level of the first user speech.

6. The electronic apparatus according to claim 1, wherein the processor is configured to identify the second noise level based on a noise level of the second user speech.

7. The electronic apparatus according to claim 1, wherein the processor is configured to:
based on the identified first recognition apparatus being the electronic apparatus and the second noise level corresponding to the second user speech received by other recognition apparatuses among the plurality of recognition apparatuses being similar to the second noise level corresponding to the second user speech received by the electronic apparatus, select the electronic apparatus as the second recognition apparatus.

8. The electronic apparatus according to claim 1, wherein the processor is configured to:
based on the identified first recognition apparatus being the electronic apparatus and the second noise level corresponding to the second user speech received by other recognition apparatuses among the plurality of recognition apparatuses being similar to the second noise level corresponding to the second user speech received by the electronic apparatus, perform the function of the electronic apparatus in accordance with a recognition result based on a preset reference among a plurality of recognition results identified by the plurality of recognition apparatuses.

9. The electronic apparatus according to claim 1, wherein, based on the identified first recognition apparatus not being the electronic apparatus and the identified second recognition apparatus being the electronic apparatus and the control command corresponding to a function of the identified first recognition apparatus, the processor is configured to transmit information to be received by the first recognition apparatus and indicating the control command.

10. A method of controlling an electronic apparatus, the method comprising, by the electronic apparatus:
receiving a first user speech including a trigger word for activating a speech recognition function of the electronic apparatus;
identifying a first noise level corresponding to the first user speech received by the electronic apparatus;
identifying, from among a plurality of recognition apparatuses that each received the first user speech and have a speech recognition function that is activatable by the trigger word, a first recognition apparatus having a highest first noise level corresponding to the first user speech, wherein the plurality of recognition apparatuses includes the electronic apparatus;
based on the identified first recognition apparatus being the electronic apparatus, turning down a level of sound output by the electronic apparatus and, while the level of sound output by the electronic apparatus is turned down, identifying, from among the plurality of recognition apparatuses, a second recognition apparatus having a second noise level corresponding to a second user speech received by each recognition apparatus of the plurality of recognition apparatuses after the first user speech, and which is highest among the plurality of recognition apparatuses, wherein the second user speech includes a control command but does not include the trigger word;
based on the identified first recognition apparatus being the electronic apparatus and the identified second recognition apparatus not being the electronic apparatus and the control command corresponding to a function of the electronic apparatus, receiving information from the identified second recognition apparatus indicating the control command included in the second user speech received by the identified second recognition apparatus; and
performing the function of the electronic apparatus in accordance with the received information.

11. The method according to claim 10, wherein based on the identified first recognition apparatus being the electronic apparatus and the identified second recognition apparatus not being the electronic apparatus and the control command corresponding to a function of the identified second recognition apparatus,
recognizing the control command using a natural language processing engine corresponding to the first recognition apparatus among a plurality of natural language processing engines respectively corresponding to the plurality of recognition apparatuses.

12. The method according to claim 10, further comprising:
based on the identified first recognition apparatus not being the electronic apparatus and the identified second recognition apparatus being the electronic apparatus and the control command corresponding to a function of the identified first recognition apparatus, transmitting information to be received by the first recognition apparatus and indicating the control command.

13. A non-transitory recording medium storing a computer program including computer readable code that, when executed by a processor of an electronic apparatus, causes the electronic apparatus to perform a method comprising:

based on a first user speech received by the electronic apparatus and including a trigger word for activating a speech recognition function of the electronic apparatus, identifying a first noise level corresponding to the first user speech received by the electronic apparatus;

identifying, from among a plurality of recognition apparatuses that each received the first user speech and have a speech recognition function that is activatable by the trigger word, a first recognition apparatus having a highest first noise level corresponding to the first user speech, wherein the plurality of recognition apparatuses includes the electronic apparatus;

based on the identified first recognition apparatus being the electronic apparatus, turning down a level of sound output by the electronic apparatus and, while the level of sound output by the electronic apparatus is turned down, identifying, from among the plurality of recognition apparatuses, a second recognition apparatus having a second noise level corresponding to a second user speech received by each recognition apparatus of the plurality of recognition apparatuses after the first user speech, and which is highest among the plurality of recognition apparatuses, wherein the second user speech includes a control command but does not include the trigger word; and based on the identified first recognition apparatus being the electronic apparatus and the identified second recognition apparatus not being the electronic apparatus and the control command corresponding to a function of the electronic apparatus, receiving information from the identified second recognition apparatus indicating the control command included in the second user speech received by the identified second recognition apparatus and performing the function of the electronic apparatus in accordance with the received information.

* * * * *